INVENTOR
GERHARD-GÜNTER GASSMANN
BY Menotti J. Lombardi Jr.
ATTORNEY $\varphi_1 = \varphi_S - \varphi_T; \quad \varphi_2 = \varphi_S - \varphi_0, \quad \Delta\varphi = \varphi_1 - \varphi_2 = (\varphi_S - \varphi_T) - (\varphi_S - \varphi_0) = \varphi_0 - \varphi_T$ INVENTOR
GERHARD-GÜNTER GASSMANN
BY [signature]
ATTORNEY SYSTEM FOR RECEIVING SIGNALS IN WHICH THE LOCAL OSCILLATOR FREQUENCY IS MADE EQUAL TO THE CARRIER FREQUENCY OF INCOMING SIGNALS Filed Nov. 8, 1966 5 Sheets-Sheet 1

INVENTOR
GERHARD-GÜNTER GASSMANN
BY Menotti J. Lombardi Jr.
ATTORNEY

INVENTOR
GERHARD-GUNTER GASSMANN
BY Meneth L. Lombardi Jr.
ATTORNEY

United States Patent Office
3,519,740
Patented July 7, 1970

3,519,740

SYSTEM FOR RECEIVING SIGNALS IN WHICH THE LOCAL OSCILLATOR FREQUENCY IS MADE EQUAL TO THE CARRIER FREQUENCY OF INCOMING SIGNALS

Gerhard Gunter Gassmann, Berkheim, Germany, assignor to International Standard Electric Corporation, New York, N.Y., a corporation of Delaware Filed Nov. 8, 1966, Ser. No. 592,774
Claims priority, application Germany, Dec. 3, 1965, St 24,726
Int. Cl. H04n 5/44
U.S. Cl. 178—7.3 6 Claims

ABSTRACT OF THE DISCLOSURE

A method for receiving high-frequency signals wherein an incoming signal, modulated on a carrier, is modulated in both amplitude and phase by an auxiliary signal which is applied in a single sideband mode. The modulated signal is mixed with a locally generated oscillator signal at the frequency and phase of said carrier and the mixed signal is then amplified. The amplified signal comprises an intelligence signal and a modulated and mixed auxiliary signal or "model signal." The "model signal" is applied to the aforementioned amplifier to control the degree of amplification thereof and is also compared, in frequency and phase, with the auxiliary signal, to provide a control signal proportional to the difference in frequency and phase between said "model signal" and said auxiliary signal. The control signal is used to control the frequency and phase of said locally generated oscillator signal.

In another embodiment of the invention, where the high-frequency signal is a video signal, the auxiliary signal is applied in a double sideband mode, and only during the period of line flyback.

U.S. Pat. No. 3,454,710 entitled Synchronous Demodulator System, issued July 8, 1969, to G. G. Gassmann and assigned to the assignee of the present invention describes a method in which a received signal is led to an amplifier (e.g. low frequency or video amplifier) via a mixer with mixer oscillator and in which, at the correct tuning, the frequency of the mixer oscillator is equal to the carrier frequency of the received signal, and in which the received signal or the mixer oscillator is modulated with an auxiliary signal, the filtered demodulator output signal being compared in a comparing circuit with the auxiliary signal, in order to produce a control voltage for vernier tuning of the frequency and/or the phase of the mixer oscillator, with the auxiliary signal being derived from the amplifier.

The present invention provides, in a further embodiment of the method according to U.S. Pat. No. 3,454,710, that amplitude and phase modulation is simultaneously carried out by the auxiliary signal. It is thereby considered advantageous, according to a feature of the invention, that the phase and amplitude modulation have a mutual phase shift of 90°, referred to the auxiliary signal and the phase shift of the phase modulation is in relation to the degree of modulation of the amplitude, that one of the two sidebands of the auxiliary modulation, performed with the aid of the auxiliary signal, is nearly suppressed in a way well known in the art. Therefore, it is proposed to provide a single sideband modulation as auxiliary modulation. In this method a single sideband modulation has the advantage that the auxiliary signal, appearing at the output of the mixer and consequently also at the output of the amplifier (low frequency or video amplifier), furnishes the information required, exactly with a sufficient amplitude for synchronization and amplifying control, namely the three bits of information concerning amplitude, frequency and phase of the very low received signal, said received signal being insufficient for both purposes.

As the auxiliary signal, appearing at the output of the mixer, represents a model of the received signal with regard to amplitude, frequency and phase, said signal is designated in the following as "model signal," in order to distinguish it from the original auxiliary signal with the aid of which the auxiliary modulation is carried out.

This model signal cannot only be used for the synchronization of the mixer oscillator, but also to control the amplification of the amplifier, so that such a control is possible also during the modulation intervals of the receiving signal.

Another very essential advantage is that in the non-synchronized condition a frequency deviation occurs between the original auxiliary signal and the model signal, so that it is possible by gaining a control voltage, depending on incremental detuning, with a phase and frequency comparing circuit, to enforce the synchronization, in other words, the synchronization intercepting range can be substantially extended by a frequency comparison. Another advantage is that, for obtaining a constant control characteristic of the synchronization control circuit, the model signal can be limited with the aid of a limitor. Finally, it is considered advantageous to apply, when receiving video signals, the combined amplitude and phase modulation only during the line flyback.

When receiving residual sideband modulated signals, e.g. television signals, it is considered of particular advantage, according to another feature of the invention, that the phase and amplitude modulation have no mutual phase shift and the phase shift of the phase modulation is in such a relation to the degree of the amplitude modulation that a double sideband square modulation occurs, having a phase angle of the sideband resultant with 30° relative to the signal carrier.

The invention is now in detail explained with the aid of an example, shown on the accompanying drawings.

FIG. 1 shows a functional block diagram with the aid of which the task the invention has to perform shall be explained in detail.

FIG. 2 shows the functional block diagram of a receiver according to the invention.

Figure 3:
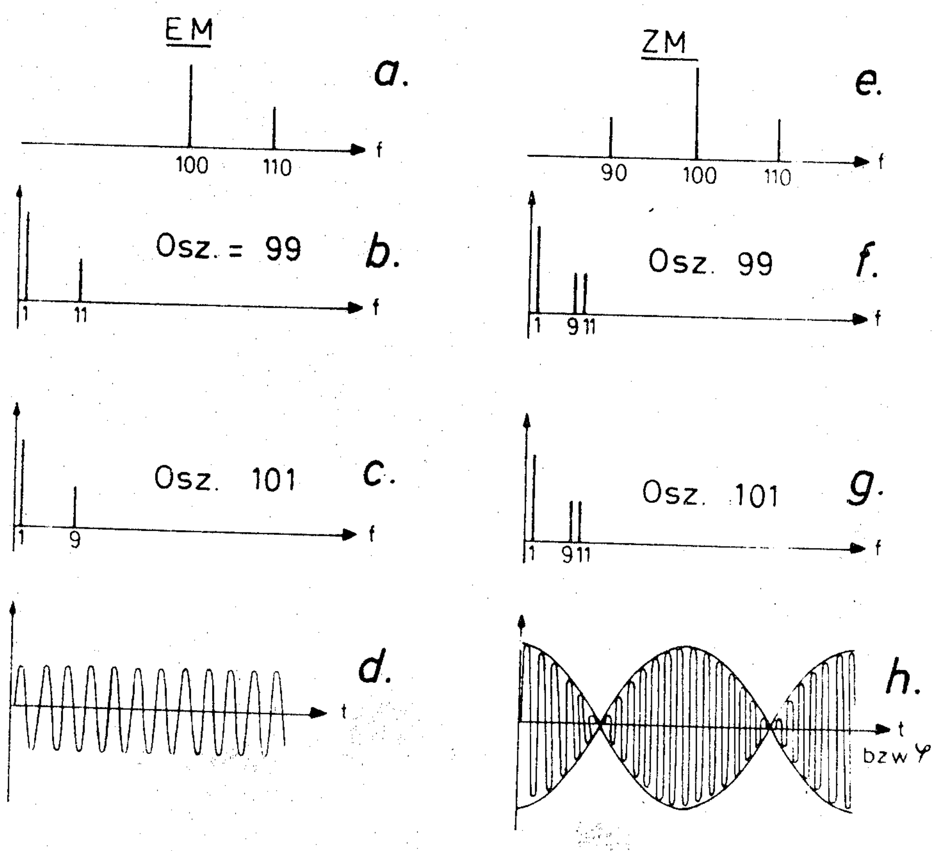
FIG. 3 shows a comparison of single sideband and double sideband modulation, in order to explain the advantages of a single sideband modulation for the auxiliary signal in the receiving method herein described.

The reception of residual sideband modulated signals, e.g. television signals, is explained with the aid of FIG. 7.

In FIG. 1, 1 represents the antenna, 2 the HF component in which none or only a small HF amplification is carried out. 3 is the mixer, 4 the mixer oscillator, 5 the amplifier (low frequency or video amplifier), 8 represents the output to the final signal receiver, e.g. the loudspeaker or the picture tube; the amplifier 5 shall have a large amplification, being variable with the aid of a control voltage. Two types of information are missing for synchronization of the oscillator and one type for controlling the amplification. For synchronizing the oscillator there is missing (1) the information on the frequency deviation $\Delta f=f_0-f_{HF}$, whereby $f_0$ is the frequency of the oscillator and $f_{HF}$ the frequency of the received signal. This information is required in order to carry out a rough tuning of the oscillator onto the receiving frequency (2) the information on the phase shift $$\Delta\varphi=\varphi_0-\varphi_{HF}$$

is missing. Said information is required in order to provide synchronization and maintain it. Both types of information must be led to the oscillator 4. This is indicated by the arrow 6 (3) the information on the amplitude of the received signal is missing. This information is necessary in order to automatically control the low frequency amplification. The low frequency signal itself is not suitable to control the amplification obtained through the amplifier 5, because at modulation intervals, to be taken into account for many signals, no low frequency signal exists as a control criterion. Only when the amplitude of the received signal is known can the amplification of amplifier 5 be set in such a way that, at the outset of the modulation, this amplification has the correct value. This is the problem to be solved.

The solution of the problem according to a feature of the invention is to provide single sideband modulation of the received signal with an auxiliary signal, its frequency being within the pass range of the amplifier 5. This is in detail explained with the aid of FIG. 2.

In FIG. 2, 1 represents the antenna, 2 the HF component which is used to modulate the received signal with the auxiliary signal, 3 is the mixer, 4 the mixer oscillator 5 the amplifier. 9 represents the auxiliary oscillator with the frequency $f_1$ and the phase $\varphi_1$. With this auxiliary signal generated by the auxiliary oscillator 9, the received signal is single sideband modulated in the HF component. If the frequency $f_0$ of the mixer oscillator 4 deviates from the frequency $f_{HF}$ of the received signal, the model signal with the frequency $f_2$ appears at the output of the mixer 3 and is amplified at the output of the amplifier 5. This frequency difference $\Delta f=f_1-f_2$ is identical in the difference $f_0-f_{HF}$. With other words, the frequency deviation of the model signal relative to the frequency of the auxiliary signal is identical in amount and direction with the frequency deviation of the received signal relative to the frequency of the mixer oscillator voltage. If the model signal appearing at the output of the amplifier 5 and the auxiliary signal, arriving from the auxiliary oscillator 9 is led to a phase and frequency comparing circuit 10, said circuit produces a control voltage, its polarity depending on the direction of the frequency deviation of the model signal relative to the auxiliary signal, and consequently on the direction of the frequency deviation of the received signal relative to the frequency of the mixer oscillator. This control voltage is led to the mixer oscillator 4 via a filter element 11 for frequency vernier tuning. The frequency vernier tuning can be performed in a way well known in the art with the aid of a varactor diode or a reactance stage. Thereby the frequency of the mixer oscillator $f_0$ is maintained very close to the frequency $f_{HF}$ of the received signal. The final synchronization is thereupon performed with a phase comparison. This phase comparison is possible, because the phase $\varphi_2$ of the model signal deviates from the phase $\varphi_1$ of the auxiliary signal by the amount $\Delta\varphi$, and this phase deviation $\Delta\varphi$ is identical with the phase difference $\varphi_0-\varphi_{HF}$ (phase of the mixer oscillator voltage and phase of the received signal). The model signal furnishes a distinct criterion for the frequency and phase deviation of the received signal relative to the mixer oscillator voltage. Only the phase deviation of the model signal related to the auxiliary signal can be shifted, in addition, by a constant amount, if the model signal undergoes an additional phase shift in the amplifier 5. This can be compensated, however, e.g. with an RC-element so that an absolute coincidence between the phase difference of both low frequency signals and of both high frequency signals is achieved. Moreover, the model signal furnishes a distinct criterion for the amplitude of the receiving signal. Therefore the model signal derived at the output of the amplifier may directly be used to produce a control voltage to control the amplification in the amplifier 5. The arrow with the designation amplitude control in FIG. 2 indicates this.

FIG. 3 gives a comparison of the single sideband modulation with the double sideband modulation to show that at the single sideband modulation, the model signal renders an exact criterion for the amplitude of the receiving signal and for the frequency deviation between receiving signal and mixer oscillator frequency.

FIGS. 3*a* to 3*d* apply for the single sideband modulation, FIGS. 3*e* to3*h* apply for the double sideband modulation.

It is assumed for example that the received signal possesses a frequency of 100 ks./s. and the auxiliary signal a frequency of 10 kc./s. At the single sideband modulation the frequency of 100 kc./s. appears as does the side frequency of 110 kc./s. as shown in FIG. 3*a*.

FIG. 3*b* shows the frequencies appearing at the output of the mixer, if the mixer oscillator frequency is not 100 kc./s. but e.g. 99 kc./s. We obtain the difference frequencies 1 and 11 kc./s. The 11 kc./s. frequency is the frequency of the model signal. The model signal thus deviates by 1 kc./s. towards the higher frequencies, relative to the 10 kc./s. auxiliary signal, thus furnishing the information that the received signal is higher by 1 kc./s. than the frequency of the mixer oscillator. FIG. 3*c* shows the conditions at a mixer oscillator frequency of 101 kc./s. Here, we have the difference frequencies 1 and 9 kc./s. 9 kc./s. is the frequency of the model signal. Here, it deviates by 1 kc./s. towards the lower frequencies relative to the auxiliary frequency and furnishes thus the information that the received signal is 1 kc./s. lower than the frequency of the mixer oscillator. At the auxiliary modulation the degree of modulation is always kept constant. Thus the amplitude of the model signal is necessarily always in proportion to the amplitude of the received signal. This amplitude relation is also maintained, if synchronization has not yet started, as may be gathered from FIGS. 3*b* and 3*c*. In FIG. 3*d* the model signal, being constant in its amplitude, is represented in a time relation.

With double sideband modulation the side frequencies 90 and 110 kc./s. are obtained, if the auxiliary signal shows a frequency of 10 kc./s. (FIG. 3*e*). If the oscillator frequency is 99 kc./s. we obtain the difference frequencies 1 kc./s., 9 kc./s. and 11 kc./s. (FIG. 3*f*). The same difference frequencies are also obtained, if the mixer oscillator frequency is 101 kc./s. (FIG. 3*g*). The information on the direction of the frequency deviation is missing. Moreover, we obtain a beat frequency of 2 kc./s. (as shown in FIG. 3*h*). If the frequency deviation between oscillator and received signal is directed towards zero the duration of the beat frequency period goes towards the infinite. In connection therewith, the amplitude of the 10 kc./s. model signal appearing at the output of the mixer not only depends on the amplitude of the receiving signal, but in addition depends on the phase difference between mixer oscillator voltage and received signal. This model signal does not contain the information on amplitude and direction of the frequency deviation of the received signal.

Figure 4:
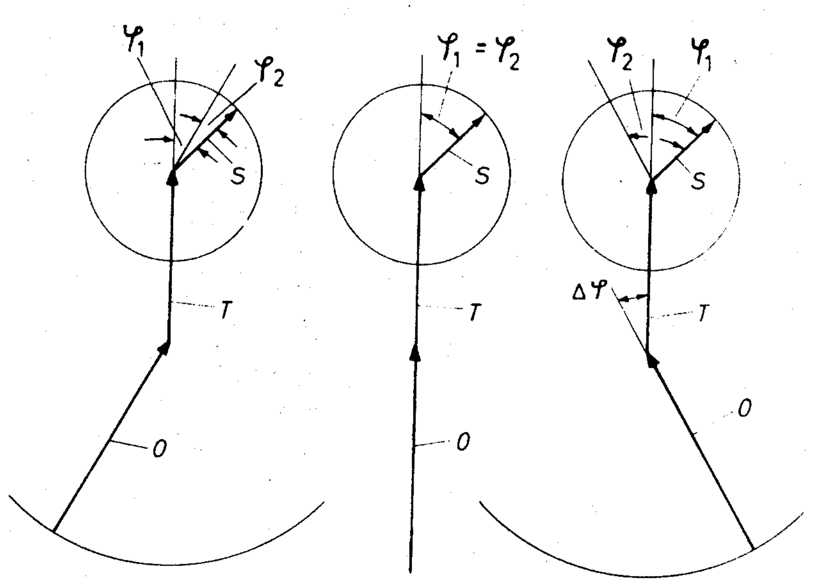
FIG. 4 shows phase relations between the oscillator voltage, the signal carrier and the sideband frequency, occuring by the auxiliary modulation.

The connection between the phase deviation of the model signal relative to the auxiliary signal and the phase deviation of the received signal relative to the mixer oscillator voltage is explained with the aid of FIG. 4. The vectors T represent the vectors of the carrier of the received signal. The vectors designated with S are the voltage vectors of the side frequency, caused by the single sideband modulation, and the vectors designated with 0 represent the voltage vectors of the mixer oscillator voltage. In this figure a particularly high modulation degree is assumed for a distinct explanation. In practice, however, a considerably lower modulation degree of the single sideband modulation will be used in general. The actual length of the vectors of the mixer oscillator voltage, designated with 0, cannot be shown in this figure, because it is considerable higher with relation to the vectors T and S, e.g. a thousand times higher. The phase angle $\varphi_1$ between the sideband vector and the carrier vector is identical with the momentary phase of the auxiliary voltage. The sideband voltage S is mixed multiplicatively in the mixer with the oscillator voltage 0. When multiplying two complex vectors a productive vector occurs having a phase which corresponds to the phase difference between the two multiplied vectors (in this case 0 and S). The model signal at the output of the mixer thus has a phase $\varphi_2$ which corresponds to the phase difference between the phase of the sideband vector and the phase of the mixer oscillator vector. It may be seen that the phase difference $\Delta\varphi=\varphi_1-\varphi_2$ between the phase of the auxiliary signal and the phase of the model signal is identical with the phase difference $\Delta\varphi$ between the phase of the oscillator $\varphi_0$ and the phase of the carrier of the received signal $\varphi_T$. For a more detailed explanation three different phase relations are shown in FIG. 4 between the mixer oscillator vector and the carrier vector. Thereby the following relations apply:

$$\varphi_1=\varphi_S-\varphi_T;\ \varphi_2=\varphi_S-\varphi_0;\ \Delta\varphi=\varphi_1-\varphi_2 =(\varphi_S-\varphi_T)-(\varphi_S-\varphi_0)=\varphi_0-\varphi_T.$$

As already mention, this is only the case, when the amplifier 5 does not influence the phase of the model signal. But, if this is the case a constant phase shift always occurs which can be compensated for with the aid of an RC-element. It has been shown with the aid of FIGS. 3 and 4 that the model signal to be derived at the output of the mixer contains the information on amplitude, frequency and phase of the received signal.

FIG. *5a* shows the modulation of the received signal with the auxiliary signal. In the modulator 12 the received signal is amplitude-modulated with the auxiliary signal arriving from the auxiliary oscillator 9. With the aid of the phase shifter 13 the auxiliary signal is phase-shifted by the phase angle $\psi$. With this phase-shifted auxiliary signal the already amplitude-modulated received signal is phase-modulated in the modulator 14.

FIG. *5b* shows the vector of the amplitude modulation, known, and FIG. *5c* shows the vector representation of the phase modulation. The FIGS. *5d* to *5h* show mixer modulations when applying an equal amplitude and phase modulation. If $\psi=0°$ or 180° a quadrature modulation is obtained (as shown in the FIGS. *5d* and *5h*). At a phase shift of $\psi=45°$ (FIG. *5e*) or 135° (FIG. *5g*) a residual sideband modulation is obtained. At a phase shift $\psi=90°$ (FIG. *5f*) a single sideband modulation is finally obtained.

This method, well known in the art, for obtaining a single sideband modulation shows, in connection with the method according to the invention, the big advantage, that no filters and oscillating circuits are required to suppress one sideband.

Figure 6:
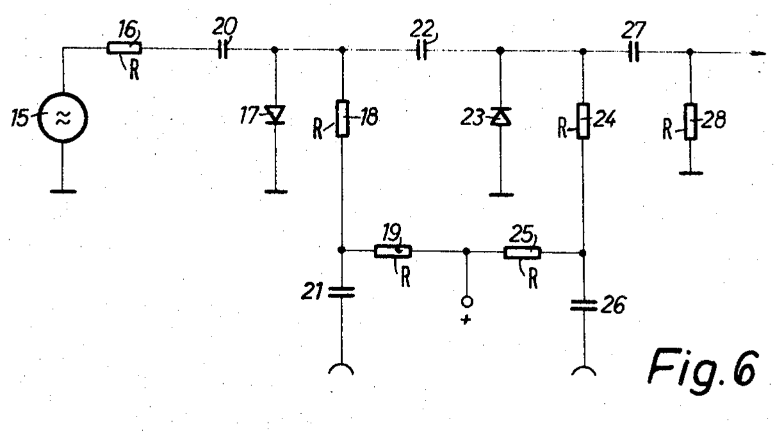
FIG. 6 shows a particularly simple circuit arrangement to obtain the single sideband modulation.

FIG. 6 shows a particularly simple circuit arrangement for simultaneous amplitude and phase modulation of a received signal. 15 designates the voltage source of the received signal (e.g. the antenna voltage); 16 is the internal resistance of 15; 20 represents a high frequency coupling capacitor, over which the received signal of diode 17 is led. Through diode 17, the resistor 18 and the resistor 19 a current flows. The high frequency resistance of diode 17 forms, together with the internal resistance 16, a voltage divider for the received signal. For the modulation of the received signal the auxiliary signal is led via the coupling capacitor 21, whereby the current is varied through the diode, and, consequently, the high frequency resistance of the diode. With the aid of this very simple modulation circuit a sufficient auxiliary amplitude modulation can be obtained. The amplitude-modulated received signal is led to a capacity diode 23 via a small coupling capacitor 22. The capacity of this diode forms a phase-shifter together with the internal resistance 16. The voltage is led to the capacity diode via the resistors 24 and 25, which voltage has such a polarity that it operates within the blocking range of said diode. The auxiliary signal, shifted by the phase angle $\psi$ is led across the capacitor 26. Thereby the capacity of the diode 23 and, consequently, the phaseshift of the received signal is modulated. Such a particularly simple circuit for phase modulation can be applied, however, only when a relatively low phase shift is desired. If larger phase shifts are necessary an all-pass filter circuit can be used in connection with a capacity diode, in a way well known in the art, in order to avoid an additional undesired amplitude modulation by the capacity diode. The received signal being amplitude and phase-modulated with the aid of this circuit is led to an HF-amplifier via the capacitor 27, or directly to the mixer. The capacitor 27, in connection with the resistor 28, prevents the transfer of the low frequency auxiliary signal to the mixer. The capacitors 20, 22 and 27 are coupling capacitors for the received signal; they are practically ineffective for the auxiliary signal.

In order to avoid interference with the signal modulation by the auxiliary modulation some possibilities have already been demonstrated in U.S. Pat. No. 3,454,710. For particularly high-valued signals, for which a particularly large interfering space is required, a multiplicative inverse modulation can be applied according to a further embodiment of the invention. This inverse modulation must be performed, after deriving the model signal at the output of the amplifier 5 and before the final signal receiver (loudspeaker or picture tube). This inverse modulation needs to be an amplitude modulation only, because phase fluctuations do not interfere in general.

For particularly sensitive receiving systems and also when using an integrated circuit technique, e.g. solid circuits, for which the economic expenditure plays no or only a negligible part, it is suitable to use two mixers and two amplifiers of which one pair (mixer and amplifier) treats the received signal only and the received signal, modulated with the auxiliary singal is led to the other mixer only and the amplifier at the output of said mixer preferably serves to amplify the auxiliary signal, both mixers being controlled by the same mixer oscillator.

With the simultaneous use of a phase and of an amplitude modulation, according to the invention as shown in FIG. 5, a quadrature auxiliary modulation can be achieved at $\psi=0$ or $\psi=180°$. There are signals for which a quadrature modulation with the auxiliary signal is better than a single sideband modulation. This is the case for signals in which information on the amplitude of the received signal and on the direction of the frequency shift is given, as is the case, e.g. for television signals. The U.S. Pat. No. 3,454,710 already showed how the information on the direction of the frequency deviation can be gained from the deviation of the sound carrier signal. Moreover, in said U.S. patent showed already that information on the ampliude of the received signal is included in the magnitude of the synchronization pulse. For such a signal also a double-sideband auxiliary modulation can be applied. The quadrature modulation is such a double sideband auxiliary modulation. It shows the advantage, compared to a pure amplitude modulation or a pure phase modulation, that the model signal appearing at the output of the mixer is negligibly small at a defined phase angle between the carrier of the received signal and the oscillator. U.S. Pat. No. 3,454,710 demonstrated that a phase shift of 60° between the received signal carrier and the oscillator is of particular advantage when receiving television signals. If now a quadrature modulation is applied in which the phase shift of the phase modulation is in such a relation to the modulation degree of the amplitude modulation that the sideband resultant of the quadrature modulation shows a phase shift of 30° relative to the carrier, the auxiliary signal disappears at the output of the mixer at the desired phase shift of 60° between the oscillator vector and the received signal carrier vector.

Figure 7B:
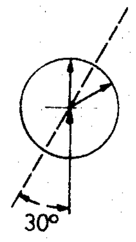
Figure 7C:
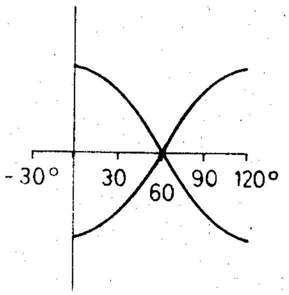
Figure 7A:
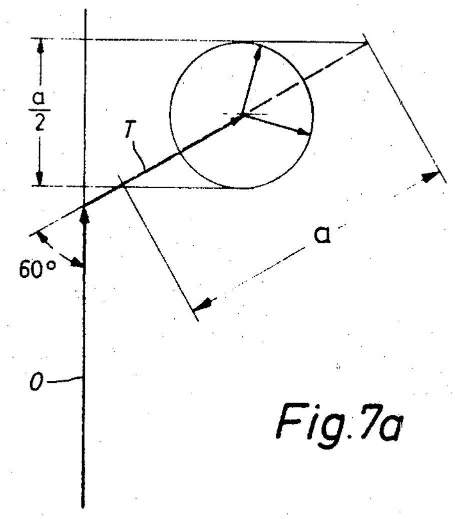

FIG. 7*a* shows the particularly suitable phase shift, described in the aforementioned U.S. patent, between the vector 0 of the oscillator voltage and vector T of the received signal carrier. The sideband resultant, shown in a dotted line, possesses the length *a* at amplitude modulation. Since a multiplicative mixing is applied and the amount of the product vector at the multiplication of two vectors depends on the cosine of the phase difference of both vectors to be multiplied, the video signal, appearing at the output of the mixer, is in proportion to the projection of the sideband resultant on the oscillator vector. The projection of this length *a* on the oscillator vector has half the size at a phase shift of 60°, that is *a*/2. This length is identical with the projection of the circle to which the sideband resultant shrinks, if one of the two sidebands is suppressed.

Figure 5A:
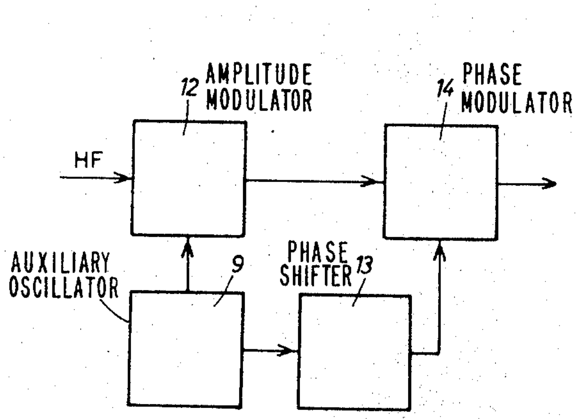
FIG. 5 shows, as a functional block diagram, an arrangement for simultaneous amplitude and phase modulation of the received signal with the auxiliary signal and the vectorial relations of the thus appearing mixer modulation at a different phase shift $\tau$ of both auxiliary voltages serving for modulation.
Figure 5B:
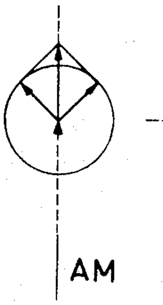
Figure 5C:
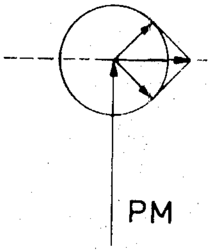
Figure 5D:
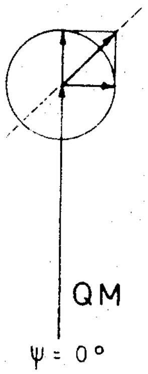
Figure 5E:
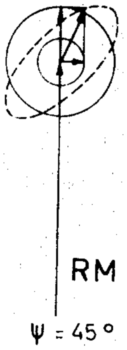
Figure 5F:
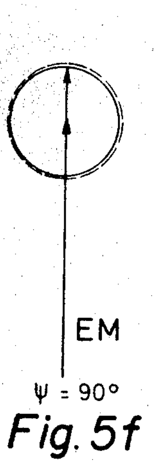
Figure 5G:
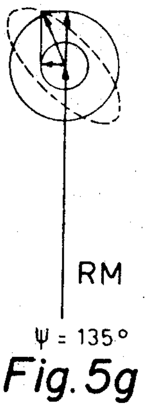
Figure 5H:
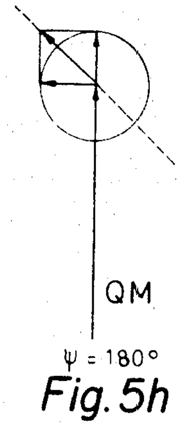

FIG. 7*b* shows a particularly advantageous quadrature modulation for this application, according to FIG. 5*b*, with a phase shift of 30° between carrier and sideband resulant. If such a quadrature modulation is applied a negligibly small auxiliary signal is obtained at the output of the mixer, at a phase shift of 60° between oscillator and signal carrier, as shown in FIG. 7*c*.

FIG. 7*c* shows the envelope curves of a beat frequency corresponding to FIG. 3*h*. As may be gathered from FIG. 7*c*, the minimum of the beat frequency is at 60°. This is because, at a phase shift of 60° between oscillator and carrier and sideband resultant a 90° shift appears between sideband resultant and oscillator.

What is claimed is:

1. A signal receiving method comprising the steps of:
- modulating an incoming signal, which is modulated on a carrier, in both amplitude and phase with an auxiliary signal;
- locally generating a signal of the same frequency and phase as said carrier;
- mixing the modulated incoming signal with said locally generated signal to cancel out the carrier frequency of said incoming signal, leaving solely a model signal and the intelligence portion of the incoming signal;
- comparing the model signal and the auxiliary signal as to phase and frequency to provide a control signal proportional to the difference in frequency and phase of said auxiliary and model signals; and
- controlling the frequency and phase of said locally generated signal with said control signal.

2. A signal receiving method, according to claim 1, further comprising the steps of:
- mutually phase shifting said phase and amplitude modulation by 90° referenced to said auxiliary; and
- suppressing one of the two sidebands.

3. A signal receiving method, according to claim 1, further comprising the steps of:
- amplifying said model signal; and
- controlling the degree of said amplification with said amplified model signal.

4. A signal receiving method, according to claim 3, further comprising the step of suppressing the amplitude modulated component of the model signal after amplification by amplitude modulating the model signal in a multiplicative inverse mode.

5. A signal receiving method, according to claim 1, wherein said incoming signal is a video signal, further comprising the step of modulating the incoming signal in amplitude phase only during the period of line flyback.

6. A signal receiving method, according to claim 1, wherein said incoming signal is a residual sideband modulated signal, further comprising the step of modulating said signal with said auxiliary signal in a double sideband quadrature mode to provide that the angular phase difference between the sideband resutlant and the carrier of said incoming signal is 30°.

References Cited

UNITED STATES PATENTS 3,057,954 10/1962 Harling et al. -------- 178—7.3

ROBERT L. GRIFFIN, Primary Examiner

R. L. RICHARDSON, Assistant Examiner

U.S. Cl. X.R.

325—444; 329—153